(12) United States Patent
Burr et al.

(10) Patent No.: US 7,096,078 B2
(45) Date of Patent: Aug. 22, 2006

(54) BOOLEAN LOGIC FUNCTION BLOCK

(75) Inventors: Kent A. Burr, Round Rock, TX (US);
Kenneth D. Krivoshein, Elgin, TX (US); Gary K. Law, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 461 days.

(21) Appl. No.: 10/448,994

(22) Filed: May 30, 2003

(65) Prior Publication Data

US 2004/0243654 A1 Dec. 2, 2004

(51) Int. Cl.
*G05B 15/00* (2006.01)

(52) U.S. Cl. .............................. 700/83; 700/23; 700/34; 700/26; 700/87; 715/763; 715/967

(58) Field of Classification Search ............ 700/24–37, 700/2–19, 79, 83–87; 702/122, 182, 186; 715/763, 853, 965, 967, 146
See application file for complete search history.

(56) References Cited

U.S. PATENT DOCUMENTS

| | | | |
|---|---|---|---|
| 4,236,207 A | | 11/1980 | Rado et al. |
| 5,301,336 A | * | 4/1994 | Kodosky et al. ............ 715/846 |
| 5,356,508 A | * | 10/1994 | Watanabe ................... 156/566 |
| 5,481,668 A | * | 1/1996 | Marcus ........................ 715/853 |
| 5,704,028 A | * | 12/1997 | Schanel et al. .............. 345/440 |
| 5,812,394 A | * | 9/1998 | Lewis et al. .................. 700/17 |
| 5,903,455 A | * | 5/1999 | Sharpe et al. ................. 700/83 |
| 5,909,368 A | * | 6/1999 | Nixon et al. .................... 700/2 |
| 5,995,969 A | * | 11/1999 | Lee et al. .................... 707/100 |
| 6,002,396 A | * | 12/1999 | Davies ........................ 715/763 |
| 6,076,952 A | * | 6/2000 | Gretta et al. .................. 700/83 |
| 6,078,320 A | | 6/2000 | Dove et al. .................. 345/333 |
| 6,151,494 A | * | 11/2000 | Gutowski et al. ............ 455/424 |
| 6,317,701 B1 | * | 11/2001 | Pyotsia et al. ............... 702/188 |
| 6,369,836 B1 | * | 4/2002 | Larson et al. ................ 715/763 |
| 6,633,278 B1 | | 10/2003 | Hoegener et al. |
| 6,898,468 B1 | * | 5/2005 | Ott et al. ....................... 700/21 |

FOREIGN PATENT DOCUMENTS

| FR | 2 789 245 | 8/2000 |
|---|---|---|
| WO | WO-1999/28794 A2 | 6/1999 |

OTHER PUBLICATIONS

Andrew J. Wilson & Tim Hill "An Industrial case study covering the use of IEC 1131-3 in connection with the engineering and operation requirements of the water industry" Mar. 30, 1999, IEEE colloquium, pp. 6/1-6/4.*

(Continued)

*Primary Examiner*—Anthony Knight
*Assistant Examiner*—Thomas Pham
(74) *Attorney, Agent, or Firm*—Marshall, Gerstein & Borun LLP

(57) ABSTRACT

A technique for configuring a Boolean logic function block displays a matrix associated with the Boolean logic function block on a display screen of a computer. A programmer may then enter configuration data into the matrix to configure the Boolean logic function block. The matrix may include a plurality of cells, some of which correspond to variables to be used in generating a function block output, and the programmer may enter configuration data into the cells. The configuration data entered into cells are indicative of logic functions to which the variables corresponding to the cells are to be provided as inputs.

67 Claims, 6 Drawing Sheets

OTHER PUBLICATIONS

Brendel W. "Programming tools for IEC 1131-3 and extensions for distributed systems" May 15, 1998, IEEE colloquium, pp. 3/1-3/7.*

"Simplified Safety System Programming," Control Engineering Online, Sep. 1, 2000; available at http:/www.manufacturing.net/ctl/index.asp?layout=article&articleid=CA211671, printed Jun. 3, 2003.

"CEM Programming Language Editor," Triconex, available at http://www.triconex.com, printed Jun. 3, 2003.

"IEC 61131-3: A Standard Programming Resource," available at hht://www.plcopen.org/intro_iec/intro_iec.htm, printed May 15, 2003.

Examination Report under Section 18(3) issued in GB 0411363.5 by the U.K. Patent Office on Apr. 25, 2006.

* cited by examiner

BOOLEAN LOGIC FUNCTION BLOCK

FIELD OF THE DISCLOSURE

The present disclosure generally relates to function blocks for use in process plants, and more particularly to designing, debugging, and implementing Boolean logic functions associated with a process plant.

BACKGROUND

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Various tools for designing control routines have been developed. For example, the International Electrotechnical Commission (IEC) has developed a standard for programmable controller languages: the IEC 61131-3 standard. The IEC 61131-3 standard specifies several graphical programming techniques.

One graphical technique specified in the IEC 61131-3 standard is commonly referred to as a "ladder diagram." The ladder diagram technique is based on traditional relay ladder logic. Using a ladder diagram, a programmer may graphically arrange a standardized set of symbols to create representations of logical equations. Another graphical technique specified in the IEC 61131-3 standard is commonly referred to as a "function block diagram." In a function block diagram, a programmer may graphically interconnect different function blocks, where each function block performs a specified function. The IEC 61131-3 standard provides standard function blocks for performing a wide variety of operations. For example, standardized function blocks may perform logical functions such as an AND or an OR function. Additionally, programmers and vendors may create their own function blocks. A programmer may "wire" different function blocks together to design a more complex function.

When designing complex logic functions, a ladder diagram or function block diagram may grow very visually complex. Because of the diagram's visual complexity, it may be difficult for a person to understand and/or follow the underlying logic of the diagram. The diagram's visual complexity may also make debugging the logic function design difficult.

SUMMARY

A technique for configuring a Boolean logic function block displays a matrix associated with the Boolean logic function block on a display screen of a computer. A programmer may then enter configuration data into the matrix to configure the Boolean logic function block. In one example, the matrix may include a plurality of cells, some of which correspond to variables to be used in generating a function block output, and the programmer may enter configuration data into the cells. The configuration data entered into cells are indicative of logic functions to which the variables corresponding to the cells are to be provided as inputs.

In one embodiment, the matrix may include a first plurality of cells and a second plurality of cells. The programmer may enter configuration data into the first plurality of cells that are indicative of logic functions according to which a plurality of intermediate values are to be determined based on a plurality of variables. Additionally, the programmer may enter configuration data into the second plurality of cells that are indicative of a logic function according to which the function block output is to be determined based on the plurality of intermediate values.

In another embodiment, a matrix representation associated with a Boolean logic function block output may be used to facilitate debugging of the function block. The matrix may be displayed on the display device of a computer, and, in one example, may include a plurality of cells for displaying intermediate results used in generating the function block output. The plurality of intermediate results may be determined based on a plurality of values corresponding, for example, to test inputs to the function block.

BRIEF DESCRIPTION OF THE DRAWINGS

The features and advantages of the apparatus and methods described herein will be best appreciated upon reference to the following detailed description and the accompanying drawings, in which.

DETAILED DESCRIPTION

Overview of Process Plant

Figure 1:
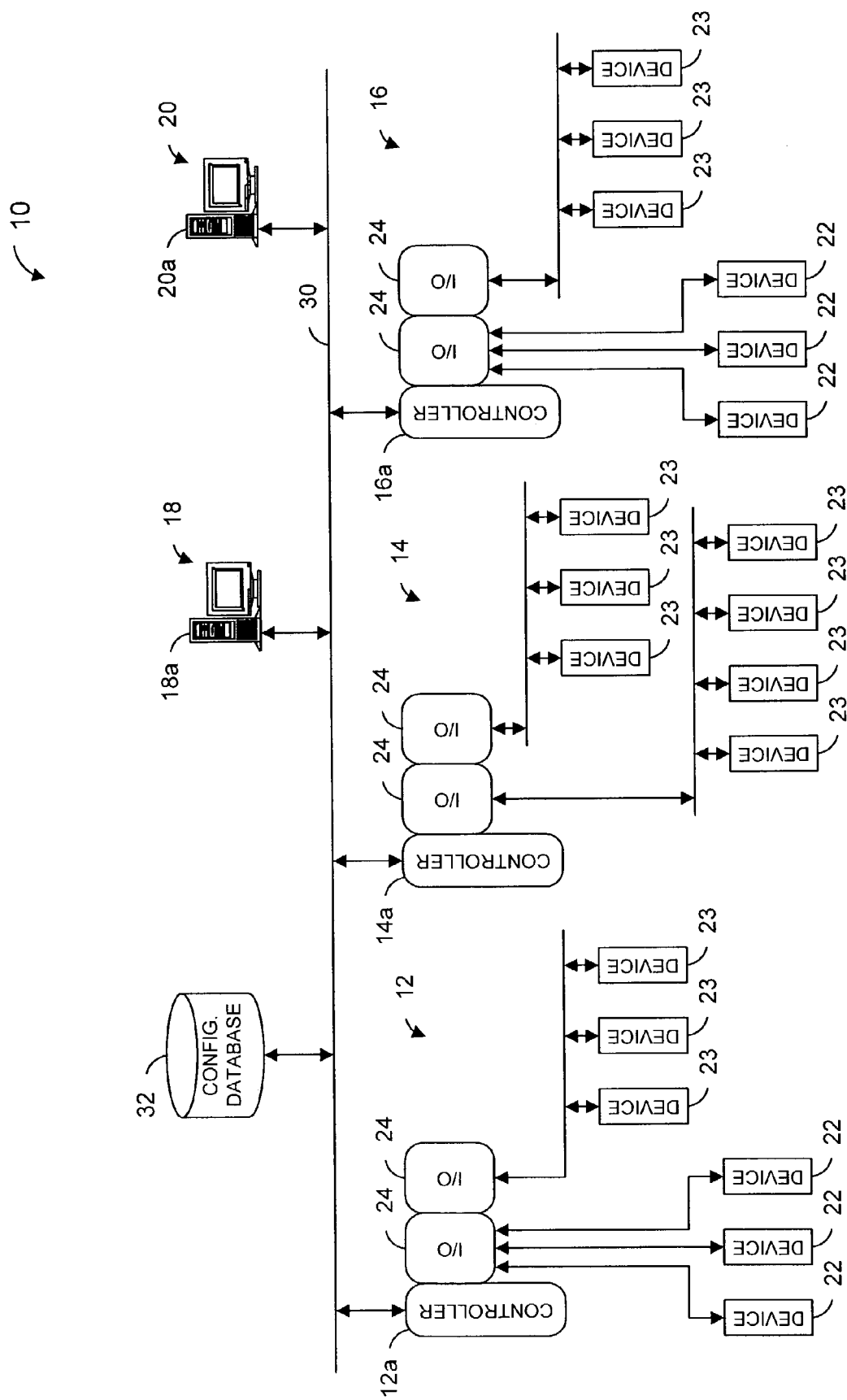
FIG. 1 is a block diagram of an example process plant.

FIG. 1 is a block diagram of an example process plant 10 that includes one or more nodes 12, 14, 16, 18 and 20. In the example process plant 10 of FIG. 1, each of the nodes 12, 14 and 16 includes a process controller 12a, 14a, 16a connected to one or more field devices 22 and 23 via input/output (I/O) devices 24 which may be, for example, Foundation Fieldbus interfaces, HART interfaces, etc. The controllers 12a, 14a and 16a are also coupled to one or more host or operator workstations 18a and 20a in the nodes 18 and 20 via a network 30 which may comprise, for example, one or more of a bus, a wired local area network (LAN) such as an Ethernet LAN, a wireless LAN, a-wide area network (WAN), an intranet, etc. While the controller nodes 12, 14, 16 and the input/output and field devices 22, 23 and 24 associated therewith are typically located down within and distributed throughout the sometimes harsh plant environment, the operator workstation nodes 18 and 20 are usually located in control rooms or other less harsh environments easily assessable by controller personnel.

Generally speaking, the workstations 18a and 20 a of the nodes 18 and 20 may be used to store and execute applications used to configure and monitor the process plant 10, and/or to manage devices 22, 23, 24 and controllers 12a, 14a, 16a in the process plant 10. Further, a database 32 may be connected to the network 30 and operate as a data historian and/or a configuration database that stores the current configuration of the process plant 10 as downloaded to and/or stored within the nodes 12, 14, 16, 18 and 20.

Each of the controllers 12a, 14a and 16a, which may be by way of example, the DeltaV™ controller sold by Emerson Process Management, may store and execute a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks typically perform one of an input function (such as that associated with a transmitter, a sensor or other process parameter measurement device), a control function (such as that associated with a control routine that performs PID, fuzzy logic, etc. control), or an output function which controls the operation of some device (such as a valve), to perform some physical function within the process plant 10. Of course hybrid and other types of function blocks exist and may be utilized. While a fieldbus protocol and the DeltaV™ system protocol may use control modules and function blocks designed and implemented in an object oriented programming protocol, the control modules could be designed using any desired control programming scheme including, for example, sequential function block, ladder logic, etc. and are not limited to being designed using function block or any other particular programming technique. As is typical, the configuration of the control modules as stored within the process control nodes 12, 14 and 16 may be stored in the configuration database 32 which is accessible to applications executed by the workstations 18a and 20a. Function blocks may be stored in and executed by, for example, the controller 12a, which is typically the case when these function blocks are used for, or are associated with standard 4–20 ma devices and some types of smart field devices such as HART devices, or may be stored in and implemented by the field devices themselves, which can be the case with Fieldbus devices.

In the system illustrated in FIG. 1, the field devices 22 and 23 coupled to the controllers 12a, 14a and 16a may be standard 4–20 ma devices, or may be smart field devices, such as HART, Profibus, or Foundation Fieldbus field devices, which include a processor and a memory. Some of these devices, such as Foundation Fieldbus field devices (labeled with reference number 23 in FIG. 1), may store and execute modules, or sub-modules, such as function blocks, associated with the control strategy implemented in the controllers 12a, 14a and 16a. Of course, the field devices 22, 23 may be any types of devices, such as sensors, valves, transmitters, positioners, etc. and the I/O devices 24 may be any types of I/O devices conforming to any desired communication or controller protocol such as HART, Foundation Fieldbus, Profibus, etc.

The controllers 12a, 14a, and 16a each include a processor that implements or oversees one or more process control routines, stored in a memory, which may include control loops, stored therein or otherwise associated therewith. The controllers 12a, 14a, and 16a communicate with the field devices 22, 23, the workstations 18a, 20a and the database 32 to control a process in any desired manner. The controllers 12a, 14a, 16a each may be configured to implement a control strategy or control routine in any desired manner.

Figure 2:
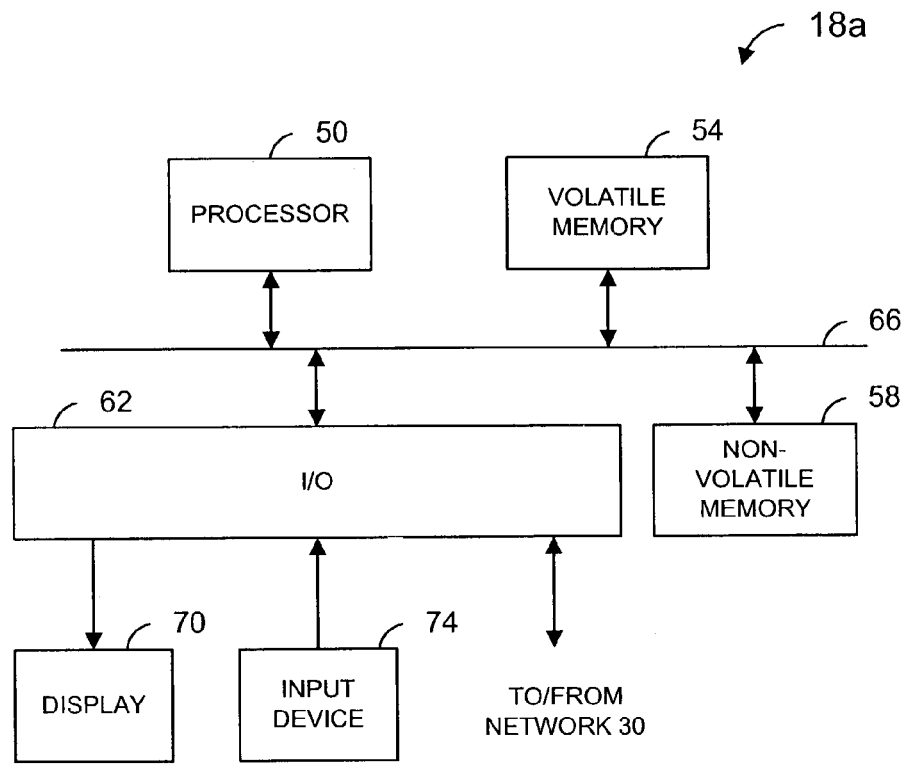
FIG. 2 is a block diagram of an example workstation schematically illustrated in FIG. 1.

FIG. 2 is a block diagram of an example workstation 18a (workstation 20a may comprise the same or similar device). The workstation 18a may include at least one processor 50, a volatile memory 54, and a non-volatile memory 58. The volatile memory 54 may include, for example, a random access memory (RAM). In some embodiments, the RAM may be backed up by one or more batteries so that data is not lost in the event of a power failure. The non-volatile memory 58 may include, for example, one or more of a hard disk, a read-only memory (ROM), a compact disk ROM (CD-ROM), a programmable ROM (PROM), an erasable programmable ROM (EPROM), an electrically erasable programmable ROM (EEPROM), a digital versatile disk (DVD), a flash memory, etc. The workstation 18a may also include a workstation I/O device 62. The processor 50, volatile memory 54, non-volatile memory 58, and workstation I/O device 62 may be interconnected via an address/data bus 66. The workstation 18a may also include at least one display 70 and at least one user input device 74, which may be, for example, one or more of a keyboard, a keypad, a mouse, a track ball, a touch screen, a light pen, etc. In some embodiments, one or more of the volatile memory 54, non-volatile memory 58, and workstation I/O device 62 may be coupled to the processor 50 via a bus separate from the address/data bus 66 (not shown), or may be coupled directly to the processor 50.

Figure 3:
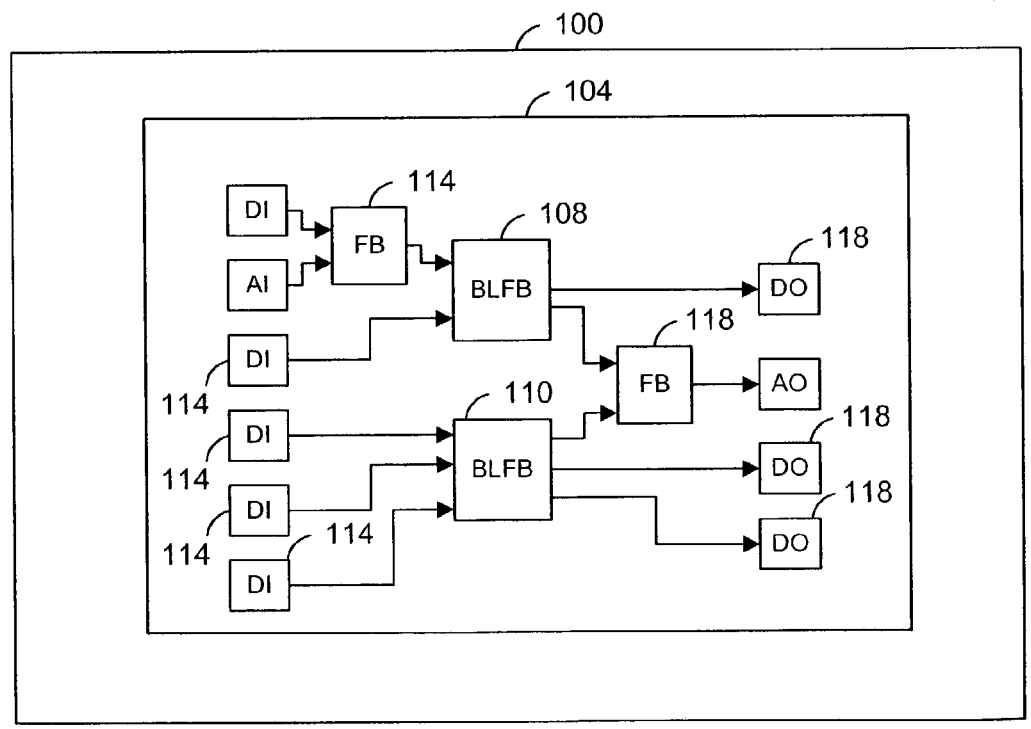
FIG. 3 is an example of a display that depicts a control module.

The display 70 and the user input device 74 are coupled with the workstation I/O device 62. Additionally, the workstation 18a is coupled to the network 30 via the workstation I/O device 62. Although the workstation I/O device 62 is illustrated in FIG. 3 as one device, it may comprise several devices. Additionally, in some embodiments, one or more of the display 70 and the user input device 74 may be coupled directly to the address/data bus 66 or to the processor 50.

Referring now to FIGS. 1 and 2, a configuration application associated with one or more of the control nodes 12, 14, 16 may be stored on and executed by one or more of workstations 18a and 20a. For example, the configuration application could be stored on the non-volatile memory 58 and/or the volatile memory 54, and executed by the processor 50. However, if desired, this application could be stored and executed in other computers associated with the process plant 10. Generally speaking, the configuration application permits a programmer to create and configure control routines and control modules implemented by the controllers 12a, 14a, 16a and/or the field devices 22, 23. These control routines and control modules may then be downloaded to appropriate ones of the controllers 12a, 14a, 16a, I/O devices 24, and/or field devices 22, 23 and via the network 30.

The configuration application may permit programming control modules and/or control routines using a function block programming paradigm. FIG. 3 illustrates one example of a display 100 depicting a control module 104. The display 100 may be part of a user interface associated with the configuration application, and the display 100 may be presented to a programmer, for example, via the display 70 of the workstation 18a. The display 100 depicts the control module 104 having a set of communicatively interconnected function blocks that can be created and downloaded to appropriate ones of the controllers 12a, 14a, 16a, I/O devices 24, and/or field devices 22, 23 and via the network 30 for implementation during operation of a process. As illustrated in FIG. 3, the control module 104 includes two Boolean logic function blocks (BLFBs) 108 and 110, a plurality of analog input (AI) and digital input (DI) function blocks, a plurality of analog output (AO) and digital output (DO) function blocks, and other function blocks (FBs). Each BLFB 108, 110 has inputs communicatively interconnected with function blocks 114, which may be DI function blocks or other FBs. The BLFBs 108, 110 each have outputs connected to function blocks 118 which may be DO function blocks or other FBs. The control module 104 may control, or may be one of a plurality of control modules that together control devices such as switches, valves, etc. Of course, control module 104 is just one example of a control module that employs BLFBs. In general, a control module may be programmed in any desired manner to include any types of function blocks communicatively coupled with any number of BLFBs in any desired manner, and configured in any desired or useful manner to perform any desired functionality. If used in, for example, a Fieldbus network, a control module may include any fieldbus type function blocks.

Using the user interface associated with the configuration application, the programmer may design a control module such as the control module 104. As just one example, the user interface may provide a mechanism for a programmer to select desired function blocks from, for example, a stencil or palette that includes a plurality of standard or customized function block stencils. Additionally, the user interface may provide a graphical diagram onto which the programmer may insert or place depictions of function blocks. The programmer may use, for example, a mouse, track ball, etc., to select a function block from the stencil or palette, and then "drag and drop" the function block onto the graphical diagram. The programmer may additionally communicatively couple function blocks by, for example, drawing a line between an output of one function block and an input of another function block using, for example, the mouse, track ball, etc.

Boolean Logic Function Block Configuration

Figure 4:
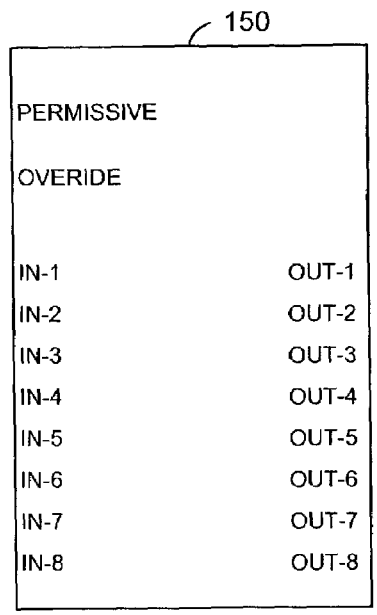
FIG. 4 is an example of a representation of a Boolean logic function block.

FIG. 4 is one example of a representation 150 of a BLFB. The BLFB representation 150 may be displayed, for example, on a user interface display such as the display 100 of FIG. 3. The BLFB representation 150 indicates that the BLFB includes eight data inputs (IN-D1 through IN-D8) and eight data outputs (OUT-D1 through OUT-D8). As will be described in more detail, the BLFB may also include other inputs besides data inputs, such as a PERMISSIVE input and an OVERRIDE input. Although the BLFB is shown in FIG. 3 to have eight data inputs and eight data outputs, other embodiments may include any desired number of data inputs and data outputs. Further, the number of data inputs need not be the same as the number of data outputs.

Using the user interface associated with the configuration program, the programmer may configure one or more function blocks. For example, the programmer may configure a BLFB to generate data outputs as logical functions of its data inputs. In particular, the programmer may specify particular logical functions associated with the data outputs. To configure the BLFB, the programmer may cause a configuration window, screen, etc. associated with the function block to be displayed on the display device 70.

Figure 5:
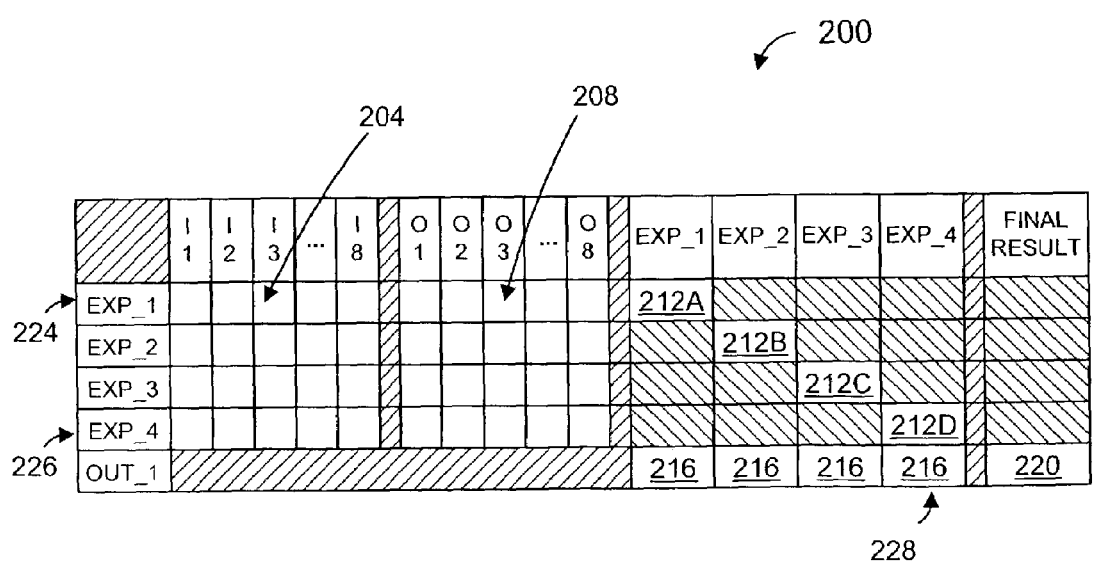
FIG. 5 is an example of a matrix for configuring and/or debugging a Boolean logic function block.

FIG. 5 illustrates one example of a matrix 200 that may be used to configure, at least in part, a BLFB, such as the BLFB associated with the BLFB representation 150 of FIG. 4. The matrix 200 may be displayed as part of a configuration window, screen, etc. associated with the BLFB. As will be described in more detail, the matrix 200 provides a mechanism for configuring one output (OUT-1) of the BLFB. In particular, a programmer may configure one or more intermediate results (EXP_1, EXP_2, EXP_3, EXP_4) as a function of data inputs (IN-1, IN-2, . . . , IN-8) to the BLFB, and data outputs (OUT-1, OUT-2, . . . , OUT-8) from the BLFB. In other embodiments, the output may be configured only as a function of data inputs (i.e., not as a function of data outputs). Additionally, the programmer may configure the output (OUT-1) as a function of the intermediate results. Each of the other outputs of the BLFB (e.g., OUT-2, OUT-3, . . . , OUT-8) may have an associated matrix the same as, or similar to, the matrix 200. Thus, a programmer may configure each of outputs OUT-2 through OUT-8 in a manner similar to that described below with respect to the output OUT-1.

As illustrated in FIG. 5, the matrix 200 includes a plurality of cells 204. Each column of cells in the plurality of cells 204 corresponds to one of the data inputs, and each row of cells in the plurality of cells 204 corresponds to one of the intermediate results. The matrix 200 also comprises a plurality of cells 208. Each column of cells in the plurality of cells 208 corresponds to one of the data outputs, and each row of cells in the plurality of cells 208 corresponds to one of the intermediate results. To configure an intermediate result as a function of the data inputs and data outputs, the programmer may enter configuration data into the cells 204 and 208 in the row corresponding to the intermediate result using, for example, a mouse, a track ball, a keyboard, a key pad, a touch screen, etc. associated with a computer (e.g., the workstation 18a or another computer). For example, to configure the intermediate result (EXP_1), the programmer may enter configuration data into cells 204 and 208 in row 224.

Each of the cells 204 and 208 in row 224 corresponds to a variable (e.g., IN-1, IN-2, . . . , IN-8, OUT-1, OUT-2, . . . , OUT-8) used to generate the intermediate result EXP_1. The configuration data entered into a cell may include data that indicates one of a plurality of logic functions to which the variable associated with the cell will be provided as an input. In one example, the configuration data may indicate whether the variable should be provided as an input to a logical AND function, a logical OR function, or a logical NOR function. In one embodiment, each output of the BLFB may be configured using one or more of a logical AND function, a logical OR function, a logical NOR function, etc. In other embodiments, only a subset of these functions may be used. In yet other embodiments, other functions may be used in addition to, or as an alternative to, a logical AND function, a logical OR function, or a logical NOR function. Other functions that may be used include, for example, a NAND function, an XOR function, etc.

The configuration data entered into a cell may optionally also include data that indicates whether the variable should be provided as an inverted input to the logic function. One example of a set of possible configuration data that may be entered into cells 204 and 208 is provided in Table 1.

TABLE 1

| CONFIGURATION DATA | EXPLANATION |
| --- | --- |
| A | Provide as input to AND function |
| IA | Invert and provide as input to AND function |
| O | Provide as input to OR function |
| IO | Invert and provide as input to OR function |
| NO | Provide as input to NOR function |

In one embodiment, any of the data of Table 1 may be entered in each of cells 204 and 208. In other embodiments, only a subset of the data listed in Table 1 may be entered in one, more, or all of the cells 204 and 208. In yet other embodiments, other data not listed in Table 1 may be entered in one, more, or all of the cells 204 and 208, in addition to, or as an alternative to, the data in Table 1. In still other embodiments, none of the data in Table 1 may be entered in one, more, or all of the cells 204 and 208.

Figure 6A:
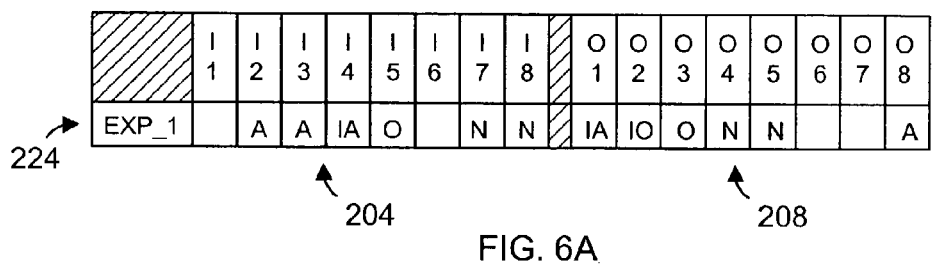
FIG. 6A is an illustrative example of configuration data entered into the matrix of FIG. 5.

FIG. 6A illustrates an example of configuration data entered into cells 204 and 208 of row 224. Other portions of the matrix 200 have been omitted for clarity. The cells corresponding to the variables IN-2, IN-3, IN-4, OUT-1, and OUT-8 include configuration data indicating that these variables are to provided as inputs to an AND function. Additionally, the cells corresponding to the variables IN-4 and OUT-1 indicate that these variables should also be inverted. Similarly, the cells corresponding to the variables IN-5, OUT-2, and OUT-3 include configuration data indicating that these variables are to be provided as inputs to an OR function, and that the variable OUT-2 should also be inverted. Also, the cells corresponding to the variables IN-7, IN-8, OUT-4, and OUT-5 include configuration data indicating that these variables are to provided as inputs to a NOR function.

Figure 6B:
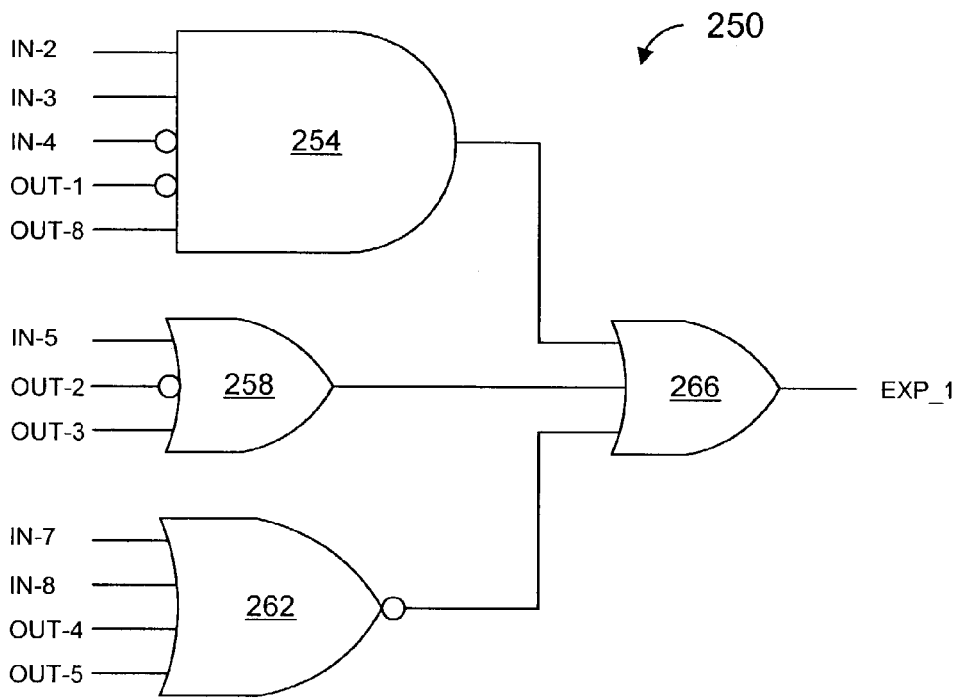
FIG. 6B is a block diagram of one embodiment of an equivalent logic circuit corresponding to the configuration data of FIG. 6A.

In one embodiment, the outputs of the AND, OR, and NOR functions, as indicated by the configuration data, are ORed together to generate the intermediate result. FIG. 6B illustrates a logic circuit 250 which is equivalent to the configuration data example of FIG. 6A. In particular, variables IN-2, IN-3, IN-4, OUT-1, and OUT-8 are provided to an AND gate 254, with variables IN-4 and OUT-1 being inverted. Variables IN-5, OUT-2, and OUT-3 are provided to an OR gate 258, with variable OUT-2 being inverted. Variables IN-7, IN-8, OUT-4, and OUT-5 are provided to a NOR gate 262. Additionally, the outputs of the AND gate 254, the OR gate 258, and the NOR gate 262 are provided to an OR gate 266 that generates the intermediate result EXP_1.

Figure 6C:
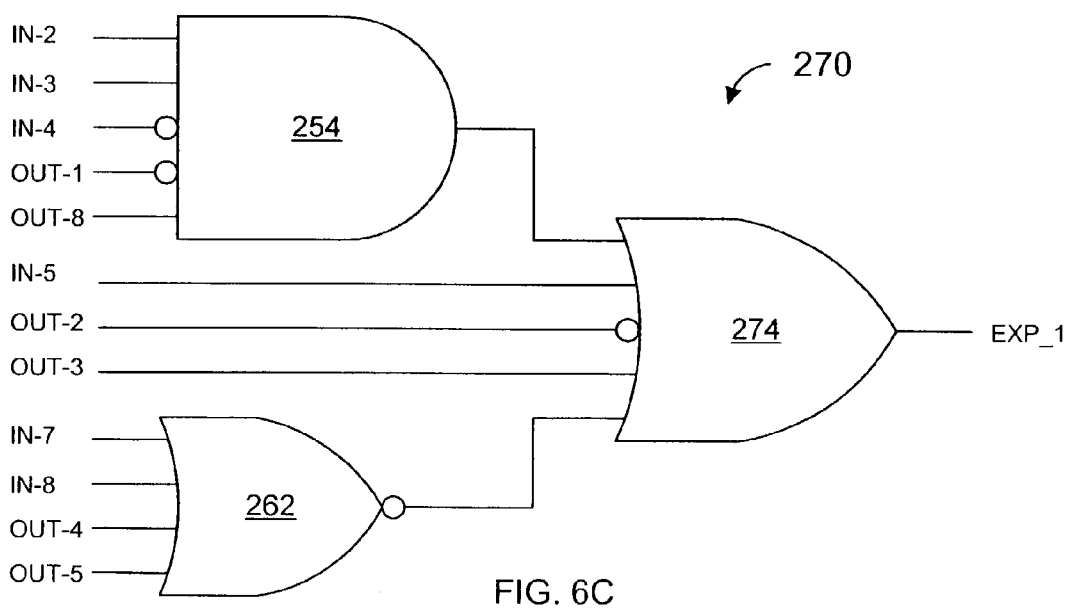
FIG. 6C is a block diagram of another embodiment of an equivalent logic circuit corresponding to the configuration data of FIG. 6A.

FIG. 6C illustrates one embodiment of another logic circuit 270 which is equivalent to the configuration data example of FIG. 6A. In the logic circuit 270, variables IN-5, OUT-2, and OUT-3 are provided to an OR gate 274, with variable OUT-2 being inverted. Also, the outputs of the AND gate 254 and the NOR gate 262 are provided to the OR gate 274. The OR gate 274 generates the intermediate result EXP_1.

Although in the above-described embodiment the outputs of the functions are ORed together to generate the intermediate result, other functions may be used as well. For example, the outputs of the functions could be ANDed, NORed, NANDed, XORed, etc. In one embodiment, the particular function could be selectable from a plurality of functions. For example, the programmer could select the function by entering configuration data into a particular cell of a matrix, or selecting the function via some other user interface mechanism such as a window, display screen, menu, etc.

Referring again to FIG. 5, to configure the intermediate results EXP_2, EXP_3, and EXP_4 as a function of the function block inputs and/or outputs, the programmer may enter configuration data into the cells 204, 208 corresponding to the intermediate results EXP_2, EXP_3, and EXP_4. The intermediate results EXP_2 EXP_3, and EXP_4 can be configured in a manner similar to that discussed above with respect to the intermediate result EXP_1. If no configuration data is entered into a cell 204, 208, the variable corresponding to that cell will not be used to generate the corresponding intermediate result.

The matrix 200 also includes cells 216, each of which corresponds to a variable (e.g., intermediate results EXP_1, EXP_2, EXP_3, EXP_4) used to generate the output OUT-1. The programmer may configure the output OUT-1 as a function of the intermediate results by entering configuration data into the cells 216 using, for example, a mouse, a track ball, a keyboard, a key pad, a touch screen, etc. associated with a computer (e.g., the workstation 18a or another computer). As with the configuration data entered into the cells 204, 208, the configuration data entered into a cell 216 may include data that indicates one of a plurality of logic functions to which the variable associated with the cell will be provided as an input. In one example, the configuration data may indicate whether the variable should be provided as an input to a logical AND function, a logical OR function, or a logical NOR function. In one embodiment, each output of the BLFB may be configured using one or more of a logical AND function, a logical OR function, or a logical NOR function. In other embodiments, only a subset of these functions may be used. In yet other embodiments, other functions may be used in addition to, or as an alternative to, a logical AND function, a logical OR function, or a logical NOR function. The configuration data entered into a cell 216 may optionally also include data that indicates whether the variable should be provided as an inverted input to the logic function.

In one embodiment, any of the data of Table 1 may be entered in each of cells 216. In other embodiments, only a subset of the data listed in Table 1 may be entered in one, more, or all of the cells 216. In yet other embodiments, other data not listed in Table 1 may be entered in one, more, or all of the cells 216, in addition to, or as an alternative to, the data in Table 1. In still other embodiments, none of the data in Table 1 may be entered in one, more, or all of the cells 216. The configuration data options available for entering into cells 204 and/or 208 may be the same as or different than the configuration data options available for entering into cells 216.

Figure 7A:
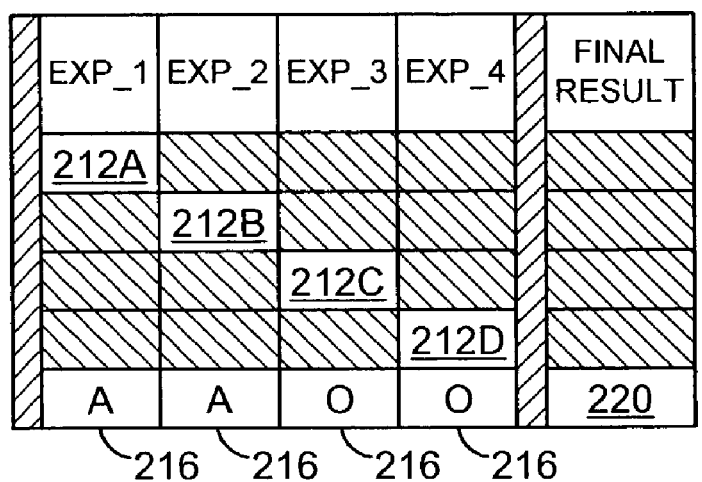
FIG. 7A is another illustrative example of configuration data entered into the matrix of FIG. 5.

FIG. 7A illustrates an example of configuration data entered into cells 216 of matrix 200. Other portions of the matrix 200 have been omitted for clarity. The cells 216 corresponding to the variables EXP_1 and EXP_2 include configuration data indicating that these variables are to be provided as inputs to an AND function. Additionally, the cells 216 corresponding to the variables EXP_3 and EXP_4 include configuration data indicating that these variables are to be provided as inputs to an OR function.

Figure 7B:
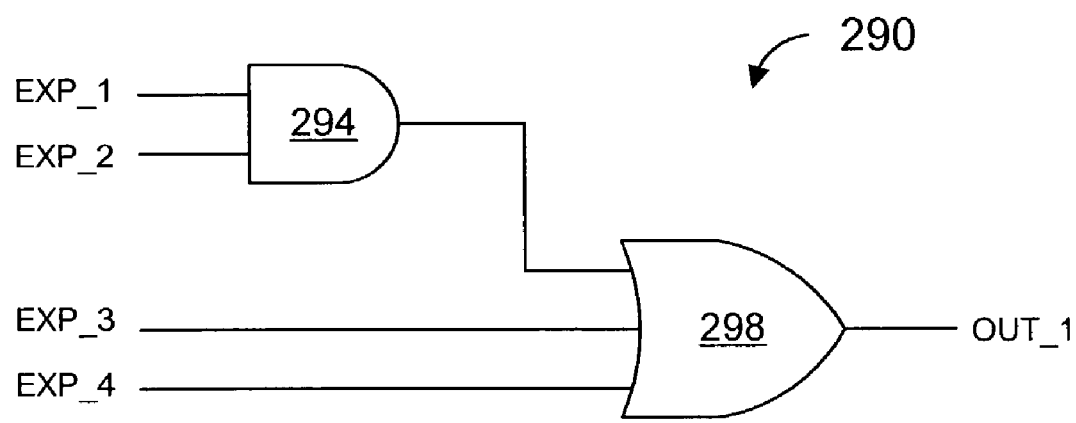
FIG. 7B is a block diagram of one embodiment of an equivalent logic circuit corresponding to the configuration data of FIG. 7A.

In one embodiment, the outputs of the AND, OR, and NOR functions, as indicated by the configuration data in cells 216, are ORed together to generate the output OUT-1. FIG. 7B illustrates one embodiment of a logic circuit 290 which is equivalent to the configuration data example of FIG. 7A. In particular, variables EXP_1 and EXP_2 are provided to an AND gate 294. Variables EXP_1 and EXP_2, and the output of AND gate 294 are provided to an OR gate 298. The OR gate 298 generates the result OUT-1. As with the generation of the intermediate results discussed above, functions other than an OR function may be used as well (e.g., AND, NOR, NAND, XOR, etc.). Additionally, the particular function could be selectable from a plurality of functions.

Referring now to FIG. 1, after the programmer has entered the configuration data into a matrix (e.g., the matrix 200 or a similar matrix) using, for example, the workstation 18*a*, the configuration data may be stored on a computer readable medium of the workstation 18*a* and/or transmitted via the network 30 to another device. For instance, the configuration data may be transmitted, for example, to one or more of database 32, controllers 12*a*, 14*a*, 16*a*, I/O devices 24, and field devices 22, 23. Prior to storing or transmitting the configuration data, the configuration data may optionally be converted into a different format.

A BLFB may then be created and/or configured according to the configuration data. The BLFB may be implemented by software, hardware, firmware, or a combination of software, hardware, and/or firmware. For example, the BLFB may be implemented by a controller such as controller 12*a*, 14*a*, or 16*a*, by one or more field devices 22, 23, etc. With regard to implementing the configured BLFB, it is to be understood that the equivalent logic circuits 250, 270, and 290 of FIGS. 6A, 6B, and 7B are illustrated for purposes of explanation. Although logic gates can be used in some embodiments to generate the function block outputs, other techniques will typically be used. For example, in some embodiments, the BLFB, may be implemented by a processor configured according to software, by a programmable logic device, e.g., a device including one or more of a gate array, a standard cell, a field programmable gate array (FPGA), a PROM, an EPROM, an EEPROM, a programmable array logic (PAL), a programmable logic array (PLA), etc.

Embodiments of a user interface, such as the user interface described above, may be implemented, in whole or in part, by a processor, for example, configured according to a software program. For instance, the workstation 18*a* or 20*a*, or some other computer, may implement, in whole or in part, the above-described user interface. A software program for implementing embodiments of a user interface may be embodied in software stored on a tangible medium such as a hard disk, a battery backed-up RAM, a ROM, a CD-ROM, a PROM, an EPROM, an EEPROM, a DVD, a flash memory, etc., or a memory, such as a RAM, associated with the processor, but persons of ordinary skill in the art will readily appreciate that the entire program or parts thereof could alternatively be executed by a device other than a processor, and/or embodied in firmware and/or dedicated hardware in a well known manner.

The configuration data associated with a BLFB may be stored on a computer readable medium such as a hard disk, a ROM, a CD-ROM, an EPROM, an EEPROM, a DVD, a FLASH memory, etc., or a memory associated with a processor.

Configuration Variations

The BLFB may be further configured in addition to the configuration data entered into the matrices (e.g., matrix 200 and the similar matrices for OUT-2 through OUT-8). For example, a user interface mechanism such as a window, display screen, etc. may be displayed to the programmer for entering additional configuration data via, for example, a mouse, a track ball, a keyboard, a key pad, a touch screen, etc. Examples of additional configuration data are provided below. It is to be understood that one or more, or none, of the additional configuration options described below may be included in various embodiments.

As is known to those of ordinary skill in the art, some control systems may provide for a logic signal or value to be set to a "BAD" status. Therefore, in some embodiments, the BLFB may be configured for handling input signals (e.g., IN-1 through IN-8) whose status is BAD. In one embodiment, the BLFB may be configured according to the options provided in Table 2.

TABLE 2

| CONFIGURATION DATA | EXPLANATION |
| --- | --- |
| IGNORE | Input signal whose status is BAD is ignored by the BLFB |
| TRUE | Input signal whose status is BAD is considered "TRUE" by the BLFB |
| FALSE | Input signal whose status is BAD is considered "FALSE" by the BLFB. |

It may be useful to latch and/or delay a function block output. In one embodiment, one, more, or all of the outputs OUT-1 through OUT-8 may be configured according to the configuration options presented in Table 3. In other embodiments, only a subset of the options listed in Table 3 may be provided. In yet other embodiments, other options not listed in Table 3 may be provided, in addition to, or as an alternative to, one or more of the options in Table 3. In still other embodiments, none of the options in Table 3 may be provided.

TABLE 3

| CONFIGURATION DATA | EXPLANATION |
| --- | --- |
| NORMAL | Output becomes TRUE when logic function becomes TRUE. Output becomes FALSE when logic function becomes FALSE. |
| LATCHED | Output becomes TRUE when logic function becomes TRUE. Output remains TRUE until reset. |
| DELAY ON | The logic function must remain TRUE for a specified time period in order for output to become TRUE. Output becomes FALSE when logic function becomes FALSE. |
| LATCH DELAY ON | The logic function must remain TRUE for a specified time period in order for output to become TRUE. Output remains TRUE until reset. |
| DELAY OFF | Output becomes TRUE when logic function becomes TRUE. The logic function must remain FALSE for a specified time period in order for output to become FALSE. |

TABLE 3-continued

| CONFIGURATION DATA | EXPLANATION |
| --- | --- |
| COUNTER | The logic function must transition from FALSE to TRUE a specified number of times in order for output to become TRUE. Output remains TRUE until reset. |

In embodiments in which a function block output is configured such that the output becomes latched until reset, configuration data may be entered into the matrix corresponding to the output that specifies how the output is to be reset. Referring now to of FIG. 5, as an example, a programmer may enter configuration data into cells 216 associated with clearing a latched output OUT-1. For example, the programmer may enter configuration data "C" into one or more of the cells 216 to designate an intermediate result or results used to clear a latched output OUT-1. In one embodiment, if a "C" is entered into more than one cell 216, the intermediate results corresponding to those cells 216 are ORed together to generate the value used to indicate when to clear a latched output OUT-1.

Figure 8A:
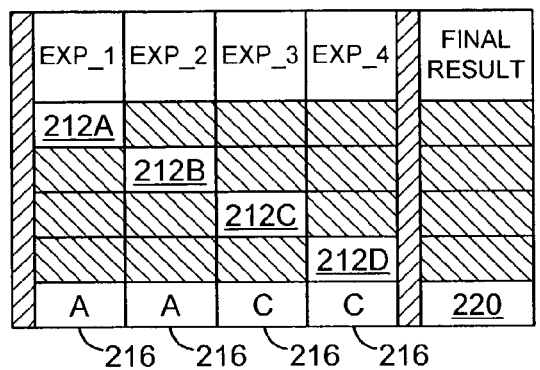
FIG. 8A is yet another illustrative example of configuration data entered into the matrix of FIG. 5.

FIG. 8A illustrates an example of configuration data entered into cells 216 of matrix 200. Other portions of the matrix 200 have been omitted for clarity. The cells 216 corresponding to the variables EXP_1 and EXP_2 include configuration data indicating that these variables are to be provided as inputs to an AND function. Additionally, the cells 216 corresponding to the variables EXP_3 and EXP_4 include configuration data indicating that these variables are to be provided as inputs to an OR function. The output of the OR function is to be used to clear a latched output. As with the generation of the intermediate results discussed above, functions other than an OR function may be used as well (e.g., AND, NOR, NAND, XOR, etc.). Additionally, the particular function could be selectable from a plurality of functions.

Figure 8B:
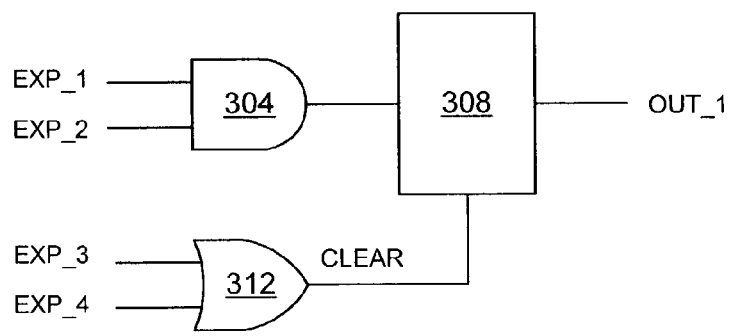
FIG. 8B is a block diagram of one embodiment of an equivalent logic circuit corresponding to the configuration data of FIG. 8A.

FIG. 8B illustrates one embodiment of a logic circuit 300 which is equivalent to the configuration data example of FIG. 8A. In particular, variables EXP_1 and EXP_2 are provided to an AND gate 304. The output of AND gate 304 is provided to a latch 308 that generates the result OUT-1. This equivalent logic circuit may correspond, for example, to the output OUT-1 being configured as a LATCHED output. Variables EXP_3 and EXP_4 are provided to an OR gate 312, and the output of the OR gate 312 is provided as a CLEAR input to the latch 308.

Debugging

Referring again to FIG. 5, in some embodiments a matrix (such as the matrix 200) may also be used for debugging purposes. For instance, cells 212 may be used to display the value of the intermediate results as the variables IN-1 through IN-8 and OUT-1 through OUT-8 change values. In particular, cell 212A may be used to display the intermediate result EXP_1, cell 212B may be used to display the intermediate result EXP_2, cell 212C may be used to display the intermediate result EXP_3, and cell 212D may be used to display the intermediate result EXP_4. Similarly, cell 220 may be used to display the value of the output as the variables IN-1 through IN-8 and OUT-1 through OUT-8, and EXP_1 through EXP_4 change values. For easier visual understanding, cells, rows, and/or columns not used in the generation of the intermediate results and/or output may optionally not be shown during debugging. For example, if no configuration data had been entered into cells 204 and 208 corresponding to the intermediate result EXP_4, the row 226 and/or the column 228 could be omitted for debugging purposes.

In some embodiments, the BLFB could be used to generate the intermediate results and/or the function block outputs OUT-1 through OUT-8 for debugging purposes. For example, test data could be presented as the function block inputs IN-1 through IN-8. In another example, the function block inputs IN-1 through IN 8 could be generated by, for example, other function blocks based on test data. In other embodiments, a BLFB simulator (e.g., implemented by a workstation such as workstation 18a or 20a) could be used to generate the intermediate results and/or the function block outputs OUT-1 through OUT-8.

Additional Variations

Referring now to FIG. 4, the BLFB may optionally have one or more other inputs in addition to the data inputs described above. For example, the BLFB may have an input (referred to as a "permissive" input) that, when FALSE, will force all outputs of the function block to FALSE. Similarly, the BLFB may have an input (referred to as an "override" input) that, when TRUE, will force all outputs of the function block to FALSE.

Figure 9:
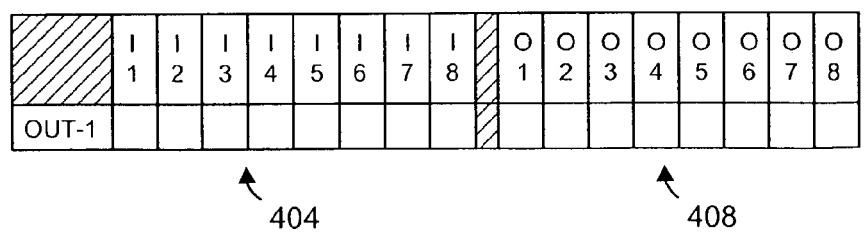
FIG. 9 is another example of a matrix for configuring and/or debugging a Boolean logic function block.

In the embodiments described above, the BLFB may be configured for generating one to four intermediate results. It is to be understood that in other embodiments, a BLFB may be configured to generate five or more intermediate results. In still other embodiments, a BLFB may not be configurable for generating any intermediate results. FIG. 9 illustrates another example of a matrix 400 that may be used to configure, at least in part, a BLFB, such as the BLFB associated with the BLFB representation 150 of FIG. 4. The matrix 400, which may be displayed as part of a configuration window, screen, etc. associated with the BLFB, provides a mechanism for configuring one output (OUT-1) of the BLFB. In particular, a programmer may configure the output OUT-1 as a function of data inputs (IN-1, IN-2, . . . , IN-8) to the BLFB and data outputs (OUT-1, OUT-2, . . . , OUT-8) of the BLFB. In other embodiments, the output may be configured only as a function of data inputs (i.e., not as a function of data outputs).

The matrix 400 comprises a plurality of cells 404, where each cell 404 corresponds to one of the data inputs. The matrix 400 also comprises a plurality of cells 408, where each cell 408 corresponds to one of the data outputs. To configure the output as a function of the data inputs and data outputs, the programmer may enter configuration data into the cells 404 and 408 in a manner similar that discussed above. For example, the programmer may enter data similar to that described with reference to Table 1.

In some embodiments, a user interface may permit a person to display the configuration data of the BLFB in different representations. For example, the configuration data may be converted into a ladder diagram representation, which could then be displayed on, for example, a display screen of a computer. As another example, the configuration data may be converted into a function block diagram representation (e.g., a logic function block diagram) which could then be displayed to the user. Such conversions can be implemented using any number of techniques, including techniques known to those of ordinary skill in the art.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for configuring, via a computer having a display device and an input device, a function block associated with a process plant, the method comprising:
displaying on the display device a matrix associated with a function block output of a function block, the matrix to configure the function block output, wherein the matrix comprises a plurality of cells, wherein each cell of the plurality of cells corresponds to (1) a variable of a plurality of variables associated with an input of a Boolean logic operation and (2) a further variable associated with an output of a Boolean logic operation; and
receiving configuration data entered into at least some of the plurality of cells via the input device, wherein the configuration data includes data indicative of one of a plurality of Boolean logic functions to which the variable corresponding to a cell is an input, the combination of the configuration data entered into the plurality of cells defining the Boolean logic operation with respect to the manner in which the plurality of variables are combined to produce the further variable.

2. A method as defined in claim 1, wherein the plurality of logic functions includes at least one of an AND function, a NAND function, an OR function, a NOR function and an XOR function.

3. A method as defined in claim 1, wherein the configuration data further includes data indicative of whether the variable corresponding to a cell is to be an inverted input to the one logic function of the plurality of logic functions.

4. A method as defined in claim 3, wherein the data indicative of one of the plurality of logic functions comprises the data indicative of whether the corresponding variable is to be an inverted input to the one logic function of the plurality of logic functions.

5. A method as defined in claim 1, wherein the plurality of variables includes a plurality of function block inputs.

6. A method as defined in claim 1, wherein the plurality of variables includes a plurality of function block outputs.

7. A method as defined in claim 1, wherein the plurality of cells includes a group of cells, wherein if configuration data entered into at least some of the group of cells is indicative of variables provided to a group of logic functions, outputs of the group of logic functions are to be provided as inputs to a further logic function.

8. A method as defined in claim 7, wherein the further logic function includes at least one of an AND function, a NAND function, an OR function, a NOR function and an XOR function.

9. A method as defined in claim 8, further comprising receiving further configuration data via the input device, the further configuration data indicative of the further logic function.

10. A method as defined in claim 1, wherein the plurality of variables includes a plurality of intermediate results.

11. A method as defined in claim 10, wherein the plurality of cells comprises a first plurality of cells and a second plurality of cells, wherein the first plurality of cells is to configure the plurality of intermediate results, and wherein the second plurality of cells is to configure the function block output based on the plurality of intermediate results;
wherein the plurality of logic functions comprises a first plurality of logic functions and a second plurality of logic functions;
wherein the configuration data entered into cells in the first plurality of cells includes data indicative of one of the first plurality of logic functions; and
wherein the configuration data entered into cells in the second plurality of cells includes data indicative of one of the second plurality of logic functions.

12. A method as defined in claim 11, wherein the second plurality of logic functions comprises the first plurality of logic functions.

13. A method as defined in claim 12, wherein the second plurality of logic functions is the same as the first plurality of logic functions.

14. A method as defined in claim 11, wherein the first plurality of cells is to configure the plurality of intermediate results based at least in part on a plurality of function block inputs.

15. A method as defined in claim 14, wherein the first plurality of cells is to configure the plurality of intermediate results further based on a plurality of other function block outputs.

16. A method as defined in claim 14, wherein the first plurality of cells is to configure the plurality of intermediate results further based on the function block output.

17. A method as defined in claim 1, further comprising:
displaying on the display device a user interface mechanism for entering further configuration data;
receiving the further configuration data entered via the user interface mechanism.

18. A method as defined in claim 17, wherein the further configuration data comprises data indicative of how the function block is to regard a function block input having a BAD status.

19. A method as defined in claim 17, wherein the further configuration data comprises data indicative of whether the function block output is to be latched.

20. A method as defined in claim 19, wherein the configuration data includes data indicative of a function for determining when to clear the function block output.

21. A method as defined in claim 17, wherein the further configuration data comprises data indicative of whether the function block output is to be delayed.

22. A method as defined in claim 17, wherein the further configuration data comprises data indicative of whether the function block output is to change state based on a count.

23. A method as defined in claim 1, further comprising creating the function block according to the configuration data.

24. A method as defined in claim 1, further comprising configuring the function block according to the configuration data.

25. A method as defined in claim 1, further comprising storing the configuration data on a computer readable medium.

26. A method as defined in claim 1, further comprising storing the configuration data in a memory.

27. A method as defined in claim 1, further comprising transmitting the configuration data via a network associated with the process plant.

28. A method for configuring, via a computer having a display device and an input device, a function block associated with a process plant, the method comprising:
displaying on the display device a first matrix associated with a function block output of a function block, wherein the first matrix is to configure a plurality of intermediate results, wherein the first matrix comprises a plurality of first cells, wherein each first cell of the plurality of first cells corresponds to a variable of a plurality of variables;

receiving first configuration data entered into at least some of the plurality of first cells via the input device, wherein the first configuration data includes data indicative of one of a first plurality of logic functions to which a variable corresponding to a first cell is an input;

displaying on the display device a second matrix associated with the function block output, wherein the second matrix is to configure the function block output based on the plurality of intermediate results, wherein the second matrix comprises a plurality of second cells, wherein each second cell of the plurality of second cells corresponds to one intermediate result of the plurality of intermediate results; and receiving second configuration data entered into at least some of the plurality of second cells via the input device, wherein the second configuration data includes data indicative of one of a second plurality of logic functions to which an intermediate result corresponding to a second cell is an input.

29. A method as defined in claim 28, wherein the first matrix and the second matrix are the same matrix.

30. A method as defined in claim 28, wherein the first plurality of logic functions includes at least one of an AND function, a NAND function, an OR function, a NOR function and an XOR function.

31. A method as defined in claim 28, wherein the second plurality of logic functions includes at least one of an AND function, a NAND function, an OR function, a NOR function and an XOR function.

32. A method as defined in claim 28, wherein the first configuration data further includes data indicative of whether a variable corresponding to a cell is to be an inverted input to the one logic function of the first plurality of logic functions.

33. A method as defined in claim 28, wherein the second configuration data further includes data indicative of whether an intermediate result corresponding to a cell is to be an inverted input to the one logic function of the second plurality of logic functions.

34. A method as defined in claim 28, wherein the plurality of variables includes a plurality of function block inputs.

35. A method as defined in claim 28, wherein the plurality of variables includes a plurality of function block outputs.

36. A method as defined in claim 28, wherein the plurality of first cells includes a group of first cells corresponding to one intermediate result of the plurality of intermediate results, wherein if first configuration data entered into at least some of the group of first cells is indicative of variables provided to a first group of logic functions, outputs of the first group of logic functions are to be provided as inputs to a further logic function.

37. A method as defined in claim 36, wherein the further logic function includes at least one of an AND function, a NAND function, an OR function, a NOR function and an XOR function.

38. A method as defined in claim 37, further comprising receiving further first configuration data via the input device, the further configuration data indicative of the further logic function.

39. A method as defined in claim 28, wherein if second configuration data entered into at least some of the second cells is indicative of variables provided to a group of logic functions, outputs of the group of logic functions are to be provided as inputs to a further logic function.

40. A method as defined in claim 39, wherein the further logic function includes at least one of an AND function, a NAND function, an OR function, a NOR function and an XOR function.

41. A method as defined in claim 40, further comprising receiving further first configuration data via the input device, the further configuration data indicative of the further logic function.

42. A method as defined in claim 28, further comprising:
displaying on the display device a user interface mechanism for entering third configuration data; and
receiving the third configuration data via the user interface mechanism.

43. A method as defined in claim 42, wherein the third configuration data comprises data indicative of how the function block is to regard a function block input having a BAD status.

44. A method as defined in claim 42, wherein the third configuration data comprises data indicative of whether the function block output is latched.

45. A method as defined in claim 44, wherein the second configuration data includes data indicative of a function for determining when to clear the function block output.

46. A method as defined in claim 42, wherein the third configuration data comprises data indicative of whether the function block output is delayed.

47. A method as defined in claim 42, wherein the third configuration data comprises data indicative of whether the function block output is to change state based on a count.

48. A method as defined in claim 28, further comprising configuring the function block according to the first configuration data and the second configuration data.

49. A method as defined in claim 28, further comprising storing the first configuration data and the second configuration data to a computer readable medium.

50. A method as defined in claim 28, further comprising transmitting the first configuration data and the second configuration data via a network associated with the process plant.

51. A method for facilitating debugging of a function block via a computer having a display device, the function block associated with a process plant, the method comprising:
displaying on the display device a matrix associated with a function block output of the function block, wherein the function block output is based on a logic function of a plurality of intermediate results, wherein the plurality of intermediate results are based on a plurality of variables, wherein the matrix comprises a plurality of first configuration cells, wherein the first configuration cells include first configuration data indicative of the logic function, wherein the matrix includes a plurality of intermediate result display cells corresponding to the plurality of intermediate results;
determining the plurality of intermediate results based on a plurality of values corresponding to the plurality of variables; and
displaying the intermediate results in the plurality of intermediate result display cells.

52. A method as defined in claim 51, further comprising receiving the plurality of values corresponding to the plurality of variables.

53. A method as defined in claim 51, wherein the matrix includes a function block output display cell, the method further comprising:
determining the function block output based on the plurality of intermediate results; and displaying the function block output in the function block output display cell.

54. A method as defined in claim 51, wherein the plurality of intermediate results are based on a plurality of corresponding other logic functions, wherein the matrix comprises a plurality of second configuration cells, wherein the second configuration cells include second configuration data indicative of the plurality of corresponding other logic functions.

55. A tangible medium storing machine readable instructions comprising:
    first code for displaying on a display device a matrix associated with a function block output of a function block, the matrix to configure the function block output, wherein the matrix comprises a plurality of cells, wherein each cell of the plurality of cells corresponds (1) a variable of a plurality of variables associated with an input of a Boolean logic operation and (2) a further variable associated with an output of a Boolean logic operation; and
    second code for receiving configuration data entered into at least some of the plurality of cells via an input device, wherein the configuration data includes data indicative of one of a plurality of Boolean logic functions to which the variable corresponding to a cell is an input, the combination of the configuration data entered into the plurality of cells defining the Boolean logic operation with respect to the manner in which the plurality of variables are combined to produce the further variable.

56. A tangible medium as defined in claim 55, further comprising third code for creating the function block according to the configuration data.

57. A tangible medium as defined in claim 55, further comprising third code for configuring the function block according to the configuration data.

58. A tangible medium as defined in claim 55, further comprising third code for storing the configuration data on a computer readable medium.

59. A tangible medium as defined in claim 55, further comprising third code for storing the configuration data in a memory.

60. A tangible medium as defined in claim 55, further comprising third code for transmitting the configuration data via a network associated with the process plant.

61. A tangible medium storing machine readable instructions comprising:
    first code for displaying on a display device a first matrix associated with a function block output of a function block, wherein the first matrix is to configure a plurality of intermediate results, wherein the first matrix comprises a plurality of first cells, wherein each first cell of the plurality of first cells corresponds to a variable of a plurality of variables;
    second code for receiving first configuration data entered into at least some of the plurality of first cells via an input device, wherein the first configuration data includes data indicative of one of a first plurality of logic functions to which a variable corresponding to a first cell is an input;
    third code for displaying on the display device a second matrix associated with the function block output, wherein the second matrix is to configure the function block output based on the plurality of intermediate results, wherein the second matrix comprises a plurality of second cells, wherein each second cell of the plurality of second cells corresponds to one intermediate result of the plurality of intermediate results; and
    fourth code for receiving second configuration data entered into at least some of the plurality of second cells via the input device, wherein the second configuration data includes data indicative of one of a second plurality of logic functions to which an intermediate result corresponding to a second cell is an input.

62. A tangible medium as defined in claim 61, further comprising fifth code for creating the function block according to the configuration data.

63. A tangible medium as defined in claim 61, further comprising fifth code for configuring the function block according to the configuration data.

64. A tangible medium as defined in claim 61, further comprising fifth code for storing the configuration data on a computer readable medium.

65. A tangible medium as defined in claim 61, further comprising fifth code for storing the configuration data in a memory.

66. A tangible medium as defined in claim 61, further comprising fifth code for transmitting the configuration data via a network associated with the process plant.

67. A tangible medium storing machine readable instructions comprising:
    first code for displaying on a display device a matrix associated with a function block output of the function block, wherein the function block output is based on a logic function of a plurality of intermediate results, wherein the plurality of intermediate results are based on a plurality of variables, wherein the matrix comprises a plurality of first configuration cells, wherein the first configuration cells include first configuration data indicative of the logic function, wherein the matrix includes a plurality of intermediate result display cells corresponding to the plurality of intermediate results;
    second code for determining the plurality of intermediate results based on a plurality of values corresponding to the plurality of variables; and
    third code for displaying the intermediate results in the plurality of intermediate result display cells.

* * * * *

UNITED STATES PATENT AND TRADEMARK OFFICE
CERTIFICATE OF CORRECTION

PATENT NO. : 7,096,078 B2
APPLICATION NO. : 10/448994
DATED : August 22, 2006
INVENTOR(S) : Kent A. Burr et al.

Page 1 of 1

It is certified that error appears in the above-identified patent and that said Letters Patent is hereby corrected as shown below:

On the title page:

<u>On the Second Page:</u>

At field (56), Other Publications, 2$^{nd}$ Reference, "hht://" should be -- http:// --.

At Column 3, line 15, "a-wide" should be -- a wide --.

At Column 3, line 22, "assessable" should be -- accessible --.

At Column 7, line 37, "to provided" should be -- to be provided --.

At Column 7, line 47, "to provided" should be -- to be provided --.

At Column 9, lines 1-2, "to provided" should be -- to be provided --.

At Column 11, lines 29-30, "to provided" should be -- to be provided --.

Signed and Sealed this

Fourteenth Day of August, 2007

JON W. DUDAS
*Director of the United States Patent and Trademark Office*